April 16, 1935.     J. R. HOUTS     1,997,932
ANIMAL TRAP
Filed April 4, 1934
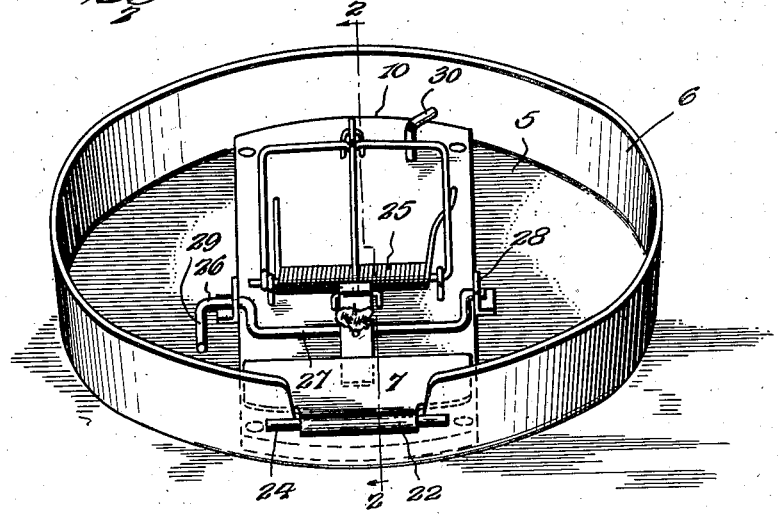
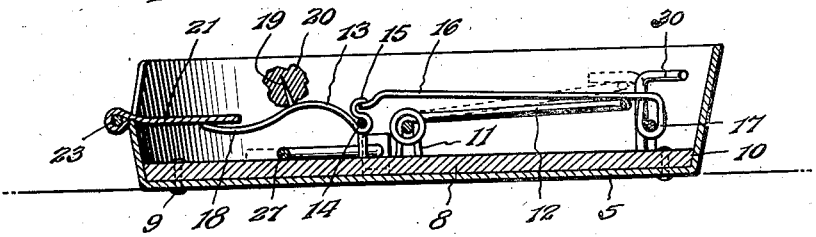
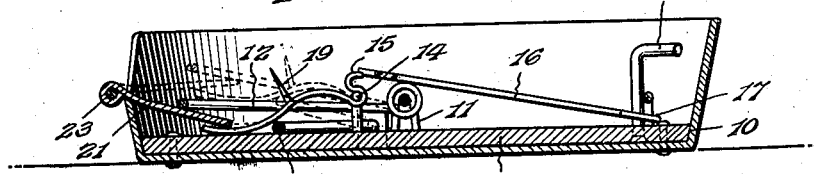
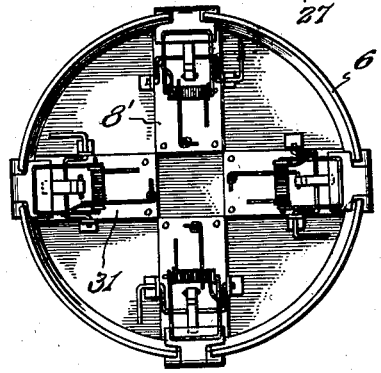
Inventor
J. R. Houts.
By Lacey & Lacey, Attorneys Patented Apr. 16, 1935

1,997,932

UNITED STATES PATENT OFFICE 1,997,932

ANIMAL TRAP

John R. Houts, McLean, Va.

Application April 4, 1934, Serial No. 718,977

8 Claims. (Cl. 43—81)

This invention relates to animal traps and more particularly to a trap especially designed for catching mice, rats and other rodents.

The object of the invention is to provide a trap of simple and inexpensive construction which is sensitive in action and will operate to automatically impale and hold an animal should it attempt to take the bait.

A further object of the invention is to provide a trap including a supporting pan having an upstanding circumferential wall spaced from the bait-carrying trigger and which constitutes a barrier to prevent a mouse or rat from reaching the bait and prematurely springing the trap.

A further object is to form the wall or barrier of the supporting pan with an entrance opening having a pivoted platform mounted therein which normally rests upon and coacts with the bait-carrying trigger so that as an animal enters the trap through said opening and approaches the bait, the weight of the animal will depress the platform and cause said animal to be impaled thereon.

A further object is to provide a trap, the base of which constitutes a reinforcement for the supporting pan and in which provision is made for elevating the impaling member or jaw and temporarily holding said member so as to facilitate setting of the trap.

A still further object is generally to improve this class of devices so as to increase their utility, durability and efficiency.

In the accompanying drawing, forming a part of this specification, and in which similar numerals of reference indicate corresponding parts in all the figures of the drawing:

Figure 1 is a perspective view of an animal trap embodying the present invention.

Figure 2 is a transverse sectional view taken on the line 2—2 of Figure 1 showing the trap in set position.

Figure 3 is a similar view showing the trap sprung or in the act of catching an animal.

Figure 4 is a top plan view illustrating a modified form of the invention.

The improved animal trap, forming the subject-matter of the present invention, comprises a supporting pan or container 5 having an upstanding circumferential wall 6, the upper edge of which is cut away to form an entrance opening 7, the walls of which are preferably inclined downwardly, as shown. Disposed within the pan 5 is the trap proper which comprises a base 8 preferably in the form of a flat strip of wood or other suitable material which is screwed, riveted or otherwise permanently secured to the bottom of the pan, as indicated at 9. The opposite ends of the base 8 are preferably curved at 10 to conform to and bear against the upstanding wall 6 so as to center the base within the pan and at the same time reinforce and strengthen the pan. Secured to the upper surface of the base 8 are upstanding loops or eyes 11 in which is journaled a spring-pressed impaling member or jaw 12 and arranged in front of the impaling member or jaw is a trigger 13. The trigger 13 is pivotally mounted on a staple 14 and has its pivoted end bent to form a substantially S-shaped hook 15 adapted to engage a trigger rod 16, which latter is pivotally mounted at 17 on the rear end of the base 8. The free or forward end of the trigger is curved downwardly at 18 and the upper surface thereof is provided with a pin 19 on which is impaled the bait, indicated at 20. Pivotally mounted on the pan, at the entrance opening 7, is a depressible platform 21 preferably formed of sheet metal, one end of which is reduced in width and bent or coiled to form an eye 22 adapted to receive a pivot pin 23. The pin 23 is rigidly secured within the eye 22, and the opposite ends thereof project beyond the adjacent ends of the eye to form trunnions 24 adapted to bear against the exterior surface of the upstanding wall 6 and act as pivots on which the platform may swing. The platform 21 is preferably removable so as to facilitate cleaning the same when necessary and said platform is retained in its seat within the entrance opening 7 by gravity. The free end of the platform rests on the free end of the trigger 18, when the trap is set, so that a mouse, rat or other animal entering the trap through the entrance opening 7 and approaching the bait in an effort to eat the same will depress the platform and, consequently, depress the trigger and release the impaling jaw so that the latter will be actuated by the spring 25 to impale the animal on said platform.

Associated with the trap is a jaw-elevating device comprising a transverse rod or shaft 26 having its intermediate portion bent to form a crank 27 and its opposite ends journaled in suitable upstanding brackets 28, one end of the shaft being bent laterally to form a finger piece or handle 29 so that by rotating or partially rotating the handle 29, the crank 27 will elevate or partially elevate the clamping jaw and thereby permit it to be conveniently grasped and swung laterally when setting the trap. A holding pin 30 is preferably rotatably mounted in the rear end of the base 6 for temporarily holding the impaling member or jaw 12 while moving the trigger pin 16 in engagement with the trigger.

In operation, the bait is placed upon the pin 19 and the handle 29 operated to partially elevate the impaling member or jaw which is subsequently grasped and swung rearwardly and in which position it is temporarily held by rotating the angular head of the pin 30 until it extends across the rear end of said impaling member. The free end of the trigger rod is then caused to engage the S-shaped hook 15 and in which position the platform 21 will rest on the free end of the trigger, as best shown in Figure 2 of the drawing. The angular end of the pin 30 is then swung rearwardly out of the path of movement of the impaling element so as to permit swinging movement of said element. With the trap in set position, should an animal enter the opening 7, the weight of the animal on the platform will depress the same thereby releasing the trigger from the trigger rod and causing the spring jaw to securely impale the animal on the platform. Inasmuch as the bait is spaced from the circumferential wall of the pan 6 and said wall is relatively high, it would be impossible, or at least difficult, for a small animal, such as a mouse or rat, to climb over the wall 6 in an attempt to take the bait.

In Figure 4 of the drawing, there is illustrated a modified form of the invention in which four or more traps 31, of the construction previously described, are mounted in the supporting pan, it, of course, being understood that there will be an entrance opening in the upstanding wall 6' of the pan opposite each trap. The pan, of the multiple form of trap shown in Figure 4, may be either round, as shown in Figure 4, hexagonal, octagonal, or any other desired shape, but when a polygonal pan is used, the rear end of each supporting base 8' will preferably be tapered or beveled to permit the ends of the bases to interengage and not take up very much room.

The traps may be made in different sizes and shapes and constructed of any suitable material without departing from the spirit of the invention.

Having thus described the invention, I claim:

1. An animal trap comprising a supporting pan having an upstanding wall formed with an entrance opening, a spring-actuated impaling member mounted within the pan, a bait-carrying trigger spaced from said wall, a trigger rod, and a depressible platform fitted in said opening and extending within the trap and held by gravity on the bait-carrying trigger.

2. An animal trap comprising a supporting pan having an upstanding wall formed with an entrance opening, a depressible platform extending within the pan at said opening and provided with trunnions bearing against said wall, a spring-actuated impaling member mounted on the bottom of the pan, a trigger rod, and a pivoted bait-carrying trigger, one end of which engages the trigger rod and the other end thereof the lower surface of the depressible platform.

3. An animal trap comprising a supporting pan having an upstanding wall formed with an entrance opening, a base secured to the bottom of the pan and having its opposite ends bearing against said upstanding wall, a spring-actuated impaling member mounted on the base, a bait-carrying trigger secured to the base and spaced from said upstanding wall, a trigger rod, and a depressible platform pivotally mounted within the entrance opening and extending within the pan and resting on the bait-carrying trigger when the trap is set.

4. An animal trap comprising a supporting pan having an upstanding wall formed with an entrance opening through the upper edge thereof, a depressible platform disposed at said entrance and having its inner end laterally enlarged and extending within the pan and its outer end formed with an eye, a pin seated in said eye and extended beyond the ends thereof to form trunnions adapted to bear against the exterior surface of the upstanding wall, a spring-actuated impaling member disposed within the pan, a trigger rod, and a pivoted trigger, one end of which normally extends beneath the platform for holding the platform in elevated position and having its other end engaging the trigger rod.

5. An animal trap comprising a supporting pan having an upstanding wall formed with an entrance opening, a base resting on the bottom of the pan and bearing against said upstanding wall to reinforce the pan, a depressible platform pivotally mounted at the entrance opening and extending within the pan, a spring-actuated impaling member mounted on the base, a trigger rod, a bait-carrying trigger pivotally mounted on the base and having one end thereof extending beneath the platform and its opposite end adapted to engage the trigger rod, a crank shaft for partially elevating the impaling member, and a rotatable pin projecting upwardly from the base and having an angular portion adapted to extend over the adjacent portion of the impaling member and hold said impaling member when engaging the trigger rod with said trigger.

6. An animal trap comprising a supporting pan having an upstanding wall formed with an entrance opening, a depressible platform projecting within the pan at said opening, a reinforcing base secured to the bottom of the pan, a spring-actuated jaw mounted on said base, a trigger rod, a bait-carrying trigger pivotally mounted on the base and having one end thereof extending beneath the platform and its other end disposed for engagement with the trigger rod, and a pin rotatably mounted on the base and provided with an angular terminal adapted to extend over and engage the jaw for holding said jaw against movement when the trigger rod is moved into engagement with the trigger.

7. An animal trap comprising a supporting pan having an upstanding wall provided with an entrance opening, a base secured to the bottom of the pan, a spring-actuated jaw mounted on the base, a bait-carrying trigger, a trigger rod, a depressible platform disposed at the entrance opening and resting on the bait-carrying trigger, and a pin rotatably mounted on the base and having an angular terminal adapted to be swung laterally over the jaw and temporarily hold said jaw against movement while the trigger rod is engaging the bait-carrying trigger.

8. An animal trap comprising a supporting pan having an upstanding wall formed with an entrance opening, an impaling member mounted within the pan, a bait-carrying trigger spaced from said wall, a trigger rod, and a depressible platform disposed at said entrance opening and extending within the trap and resting on the bait-carrying trigger.

JOHN R. HOUTS.